United States Patent [19]
Gurley

[11] Patent Number: 5,611,822
[45] Date of Patent: *Mar. 18, 1997

[54] INDIGO DYE PROCESS

[75] Inventor: Sally Gurley, Boulder, Colo.

[73] Assignee: Allegro Natural Dyes LLC, Longmont, Colo.

[ * ] Notice: The term of this patent shall not extend beyond the expiration date of Pat. No. 5,378,246.

[21] Appl. No.: 639,714

[22] Filed: Apr. 29, 1996

Related U.S. Application Data

[63] Continuation of Ser. No. 472,251, Jun. 7, 1995, abandoned, which is a continuation-in-part of Ser. No. 366,241, Dec. 23, 1994, Pat. No. 5,494,491, which is a continuation-in-part of Ser. No. 59,545, May 10, 1993, Pat. No. 5,378,246.

[51] Int. Cl.⁶ .................. D06P 1/34; D06P 3/60
[52] U.S. Cl. .............. 8/625; 8/631; 8/148; 8/653; 8/930; 8/111
[58] Field of Search ................ 8/631, 650, 918, 8/930

[56] References Cited

U.S. PATENT DOCUMENTS

| | | |
|---|---|---|
| 678 | 4/1838 | Woodcroft . |
| 83,502 | 10/1863 | Iversen . |
| 4,166,717 | 9/1979 | Fono et al. ................ 8/38 |
| 4,247,295 | 1/1981 | Patxot ...................... 8/465 |
| 4,283,198 | 8/1981 | Fletcher .................... 8/653 |
| 4,378,246 | 3/1983 | Gurley ...................... 8/625 |
| 4,613,336 | 9/1986 | Quinnen ..................... 8/494 |
| 4,752,301 | 6/1988 | Koch . | |
| 4,845,789 | 7/1989 | Morton et al. . | |

FOREIGN PATENT DOCUMENTS

| | | |
|---|---|---|
| 1563436 | 4/1996 | France . |
| 60-17185 | 1/1985 | Japan . |
| 60-119285 | 6/1985 | Japan . |

OTHER PUBLICATIONS

Trotman, E.R., "Dyeing and Chemical Technology of Textile Fibres," 6th Ed., (1984) Edward Arnold, A div. of Hodder & Stoughton, London Melbourne Auckland, pp. 306–309, no month available 1984.

Bliss, Ann, "A Handbook of Dyes from Natural Materials," Charles Scribner Sons (1981) pp. 38–39 no month available 1981.

Yoshii, A. et al., "Studies on the dyeing behavior of indigo in nitrogen," from Chemical Abstract CA109(22)192037f, no month available 1987.

Primary Examiner—Margaret Einsmann
Attorney, Agent, or Firm—Greenlee, Winner and Sullivan, P.C.

[57] ABSTRACT

This invention provides processes for dyeing fibers with indigo including placing the fibers in a substantially enclosed compartment of a commercial dye apparatus, which is equipped with means for introducing a non-oxidizing gas into the compartment; prior to or following placing the fibers in the compartment, introducing a non-oxidizing gas into the compartment to produce a substantially non-oxidizing atmosphere therein; contacting the fibers with a dye liquor comprising leuco indigo in the compartment such that the leuco (reduced) indigo is taken up by the fibers; and oxidizing the leuco indigo taken up by the fibers to produce a blue color in the fibers.

22 Claims, 2 Drawing Sheets

INDIGO DYE PROCESS

RELATED APPLICATIONS

This application is a continuation of copending application Ser. No. 08/472,251 now abandoned filed Jun. 7, 1995, which is a continuation-in-part application of Ser. No. 08/366,241 filed Dec. 23, 1994, now U.S. Pat. No. 5,494,491 a continuation-in-part of Ser. No. 08/059,545 filed May 10, 1993, now U.S. Pat. No. 5,378,246.

FIELD OF THE INVENTION

This invention relates to improved processes for dyeing fibers with indigo dye, including natural cellulose fibers, textile fabric and yarn.

BACKGROUND OF THE INVENTION

Indigo has been used to dye fabric with "indigo blue" since before recorded history. The sap which oozes from the plant when bruised was applied to fabric by ancient Egyptians, Greeks and Romans. Indigo has been used in India to dye fabric for at least 4,000 years by methods which are practically identical to methods employed today. Indigo was introduced in Europe in large quantities by the Dutch East India Company in the early 17th century.

Indigotin ($C_{16}H_{10}N_2O_2$) is the true coloring matter of indigo. When pure, indigotin forms a dark, rich blue powder or bronzy blue-colored needle crystals. The most important reaction of indigotin is its reaction with reducing agents. When subjected to a reducing agent in the presence of alkali, indigotin combines with two atoms of hydrogen and is reduced to a colorless body, known as indigo-white or the leuco form, which is insoluble in water, but dissolves in alkali, with a yellow color. This reaction may be represented, as follows:

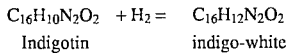

It is reoxidized to indigotin with great ease, simply by exposure to oxygen, by the following equation:

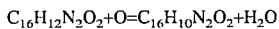

The commercial vat method utilizes these reactions to dye fabric or yarn indigo blue. Commercial indigo vat dyeing is carried out in an aqueous alkali vat containing the reduced leuco form of indigo. Fibers in the form of warp yarns are dipped into the vat for a residence time sufficient to permit the fibers to absorb the desired amount of leuco dye. Following each dip, the fibers are squeezed between rolls and then carried into the open air, which is known as "skying," whereby the leuco dye is oxidized to the insoluble indigotin form in the fibers.

Oxidation of the reduced leuco form in the dip vat is troublesome in vat dyeing. The oxidation occurs where the dye liquor contacts the air, especially in the region of the squeeze rolls where multiple interfaces are generated, exposing large areas of leuco dye liquor to the air as the dye liquor drains from the squeeze rollers. This oxidation results in significant loss of dye liquor and formation of a floating scum of oxidized insoluble dye. U.S. Pat. No. 4,283,198 discloses an indigo dye process which includes an enclosure of the air-liquid interface of a leuco indigo bath comprising sodium hydrosulfite and sodium hydroxide with floating planks of foamed plastic, and with a box-like container covering the fabric on a portion of its upward travel into a set of rollers. This enclosure results in consumption of oxygen at the enclosed interface by reducing agents in the dye liquor. However, the enclosure cannot be substantially gas tight and would not result in an inert gas-enclosed process. Further, the process is impractical for commercial indigo dyeing operations.

Yoshii, A., et al. (1987), "Studies on the Dyeing of Indigo II—The Dyeing Behavior of Indigo Pure in Nitrogen," Sanyo Gakueb Tanki Daigaku Kenkyu Ronshu (Assortment of Research Papers at Sanyo Gakuen Junior College), 18:55–62, discloses bubbling nitrogen through an Erlenmeyer flask containing leuco indigo and reducing agents. This reference discloses satisfactory dyeing of test squares of fabric which are released into the dye liquor from a compartment in the laboratory apparatus after the nitrogen has been bubbled in. This article does not disclose a method for prevention of formation of oxidized indigo scum in conventional indigo dye equipment, nor any commercially viable method of contacting the fabric with the dye liquor. Further, this article does not teach that the amount of reducing agent required is less in the presence of nitrogen.

Synthetic indigo has essentially replaced natural indigo in commercial dyeing. The production of synthetic indigo requires the use of toxic materials, including sodium cyanide, formaldehyde, sodium and potassium hydroxide and synthetically produced aniline, which are carried through to the cloth. The waste products include the unspent toxic chemicals described above, plus sulfuric and hydrochloric acid, sodium hydroxide and insoluble salts. Thus, there has been a renewed interest in the use of natural indigo; however, the prior natural indigo dye methods result in dyed fibers or fabric which are not nearly as washfast and lightfast as fibers dyed with synthetic indigo dyes, and naturally dyed colors are difficult to reproduce using known techniques.

Numerous methods are known to the art for dyeing fibers and fabrics. In the production of a textile product the dyeing step can be accomplished at any one of several points along the way. Generally speaking, all of the dye processes can be broken down into two categories, batch processes and continuous processes. Batch processes involve the immersion of the fiber in a dyebath for extended periods of time, whereas in continuous processes the fibers pass quickly through the dye. Additionally, dye processes can be broken down into two other categories, atmospheric and pressure. This categorization refers to whether or not the dyeing is performed under pressure.

In the earliest stages of making a textile product, the raw fiber can be dyed prior to being spun into a yarn. This is known as stock dyeing and is used to create special effects, such as heathered yarns, by blending different colors or by blending a dyed yarn with an undyed yarn. The different colors of stock can be blended and spun together to create various effects. This method is used for fibers such as cotton and wool. The saying "dyed in the wool" apparently refers to stock dyeing. Stock dyeing is a batch process that can be atmospheric or pressurized.

There are two primary methods for dyeing yarn. The first method is known as skein dyeing. A skein of yarn is similar to a coiled rope. This method is used primarily for dyeing silk and heavy wool yarns, though some cotton is dyed this way also. Skein dyeing can be performed in pots on gas burners or in more specialized machinery. Skein dyeing is a batch process and is generally atmospheric.

The majority of the cotton yarns and finer wool yarns are dyed under pressure in what is known as package dye machinery. The yarn is machine wound onto a perforated dye tube. The resulting mass of yarn is known as a package. In production, many of these packages are stacked onto center cores and placed into a pressurized vessel. The dye is forced through the cores, dyeing from the inside of the package to the outside of the package. Then the flow is reversed and the dye moves from the outside to the inside. Package dyed yarns are used to produce both woven and knitted products. The dyed yarn can be easily wound onto cones that the industry uses to set up both weaving and knitting equipment. Yarns can also be beam dyed. Beam dyeing is done in the same manner as package dyeing. A beam is simply a gigantic package. Package and beam dyeing broadly fit in the pressurized batch process category of dye methods.

Yarns can also be dyed on a continuous range. This method is mostly used for producing denim products. Special continuous ranges are used for indigo dye methods. These indigo ranges allow bundles or "ropes" of continuous yarn to pass through a series of troughs or "boxes" containing the dye. Between each successive "dip" in the dye box, the yarn travels through a series of rollers or "pads" that squeeze the excess dye off, and then the yarn travels up into the air before continuing on into the next box of dye. This is known as "dipping skying". The ropes of yarn come off a beam at the beginning of the indigo range and are taken up on another beam at the end of the range. This method of dyeing is not a batch process, rather it is a continuous process.

Garment dyeing involves the dyeing of completed garments or other sewn products. The products are cut and sewn using undyed fabric and then dyed in one of two basic types of garment dye machines.

Some garment dyeing is done in what is known as paddle equipment. Paddle equipment is simply a heated vessel with a paddle wheel attached to the top. In order to operate, the vessel must be completely full so that the paddle moves the surface of the dyebath, thus circulating the garments in the dyebatch. Soaking wet garments must be removed from the vessel and transferred to an extractor for water removal prior to drying.

Rotary garment dye equipment resembles front-loading washers. These machines are water-tight machines that circulate the garments via a rotating drum. Most rotary garment dye machines also extract liquid from the garments using high-speed rotation of the drum.

There are many textile operations that dye the fabric after it has been woven or knitted. The various processes used to dye fabric are known generically as "piece" dyeing. Here again, there are batch piece-dye processes and continuous piece-dye processes.

Most woven materials are dyed on a continuous range. The undyed fabric comes off of a roll and is held taut in its full open-width position as it passes through one or two dye boxes, then through rollers or pads that help distribute and squeeze the dye into the fabric. The fabric then enters a steam cabinet where heat is applied and the dye is set. It then enters a drying chamber and comes out of the dryer as a dyed fabric.

Knit fabrics are mostly dyed in "rope" form, meaning that the fabric is not held taut in an open-width position. The fabric is allowed to bunch up and forms what is known as a rope. This method of dyeing is also called "piece dyeing." The primary methods used for piece dyeing knit fabrics are jet-dyeing and beck-dyeing. Jet dye equipment is pressurized. Beck dye equipment is not. In all cases, the fabric is made to circulate through the dye bath. Several rolls of knit fabric are sewn together end-to-end to form a huge loop of knit fabric. This loop of fabric is fed into the machines. Jet dye machines circulate the fabric using the pressurized flow of the dyebath itself to move the fabric. Beck dye machines use a mechanical system to pull the fabric out of the dye bath in the front of the machine over rotating arms and back down into the dye bath at the back of the machine. Jet dye machines typically use less water and are airtight machines. Hybrid machines that are similar to both jet and beck dyeing are also used.

In a commercial piece dyeing machine, the fabric to be dyed is generally in the form of a seamed continuous loop of fabric, although the ends may be loose in certain machines. The width of the fabric may, for example, be 28 to 60 inches and 50 to 1,000 pounds or more of fabric may be dyed in each batch. The fabric is continuously lifted or circulated out of the dye liquor.

In conventional dye processes and equipment, the fibers being dyed, the dye bath, and the surrounding atmosphere all contain oxygen which would interfere with indigo dyeing, causing oxidation and waste of large quantities of indigo. As oxidized indigo is insoluble, it would form a polluting scum and not be taken up into the fibers. The dyed product would be streaked and have deposits of oxidized indigo on its surface. Large quantities of reducing agents in the dye bath would be required and would be consumed by the oxygen present in the system.

No conventional commercial indigo dye apparatus allows for input into a substantially closed container of undyed fabric and leuco indigo and output from said container of dyed fabric; and no conventional commercial indigo dye process utilizes nitrogen or other inert or non-oxidizing gas to reduce or eliminate the need for conventional reducing agents.

It has not previously been possible to dye with indigo in conventional garment dye machines wherein the constant agitation of the fabric causes excessive oxidation of indigo in the dye liquor resulting in little or uneven uptake by the fabric and loss of most of the dye to the insoluble oxidized form. Similarly, conventional piece dyeing machines, range dyeing and package dyeing machines involve significant contact of the fabric being dyed with air with concomitant oxidation of the indigo.

There is thus a need for commercial processes and apparatuses for dyeing fibers, particularly cellulose fibers, which are suitable for natural and synthetic indigo and which produce a consistent natural, washfast and lightfast color.

SUMMARY OF THE INVENTION

The improved processes for dyeing textile fibers with indigo dye of this invention are suitable for dyeing natural cellulose fibers, including, for example, cotton and linen fabrics, wool, and hemp, as well as silk, and synthetic fibers and textiles, including, for example, nylon, Rayon™ and Tensel™. The indigo dye processes of this invention are particularly, but not exclusively, adapted for use with natural indigo dye while avoiding many of the problems associated with the use of vegetable dye processes including natural indigo, and prior art synthetic dye processes. Reproducible colors are achievable which are washfast and lightfast, and streaking is avoided. Depending on the intensity of color required, the process may be repeated one or more times.

The processes of this invention for dyeing fibers with indigo comprise placing the fibers in a substantially enclosed compartment of a commercial dye apparatus, wherein the apparatus comprises means for introducing a non-oxidizing gas into the compartment; prior to or following placing the fibers in the compartment, introducing a non-oxidizing gas into the compartment to produce a substantially non-oxidizing atmosphere therein; contacting the fibers with a dye liquor comprising leuco (reduced) indigo in the compartment whereby the leuco indigo is taken up by the fibers; and oxidizing the leuco indigo taken up by the fibers to produce a blue color in the fibers.

Natural or synthetic indigo may be used; however, natural indigo is preferred as involving less pollutants in its preparation.

The commercial dye apparatuses in which the processes are conducted are modified where necessary to provide a substantially enclosed compartment capable of maintaining a non-oxidizing atmosphere. The compartment need not be completely airtight, so long as the apparatus has means for introducing a non-oxidizing gas into the compartment at a rate which keeps pace with leakage such that a substantially non-oxidizing or inert atmosphere is maintained within the compartment. As used herein, the term "inert atmosphere" refers to an atmosphere which is inert to the chemical process carried out in the enclosure. The inert atmosphere of this invention must be substantially free of oxygen. Nitrogen, helium or other relatively inert gases may be used alone or in combination to produce the inert atmosphere.

Commercial dye machines modified for conducting the processes of this invention comprise an enclosed compartment and means for introducing a non-oxidizing gas as well as means for introducing leuco indigo dye liquor into said compartment. Conventional rotary-type garment dye, piece dye and package dye machines generally have a substantially airtight enclosed compartment and are modified to provide means for introducing non-oxidizing gas and leuco indigo dye liquor into the compartment. The leuco indigo dye liquor is preferably introduced below the surface of liquid in the compartment. The non-oxidizing gas is preferably introduced into the gaseous atmosphere in the compartment in the case of garment and piece dyeing machines. In the case of package dyeing machines, the non-oxidizing gas is preferably introduced into the bottom of the enclosed compartment when no liquid is present therein, but may also be bubbled through liquid present therein. Range dyeing machines are modified by the addition of a covering over the dye trough to provide an enclosed compartment, to which means for introduction of non-oxidizing gas and leuco indigo dye liquor are added.

In conducting indigo dye processes by prior art means, the leuco indigo oxidizes to form an insoluble scum which is not easily taken up by the fibers, but rather deposits on the fiber surfaces in clumps and forms a scum on the surface of the dye liquor, resulting in waste. To minimize such oxidation, in the processes of this invention, the atmosphere within the enclosed compartment should be as free of oxygen or other oxidizing agents as possible.

DETAILED DESCRIPTION OF THE PREFERRED EMBODIMENTS

Figure 1:
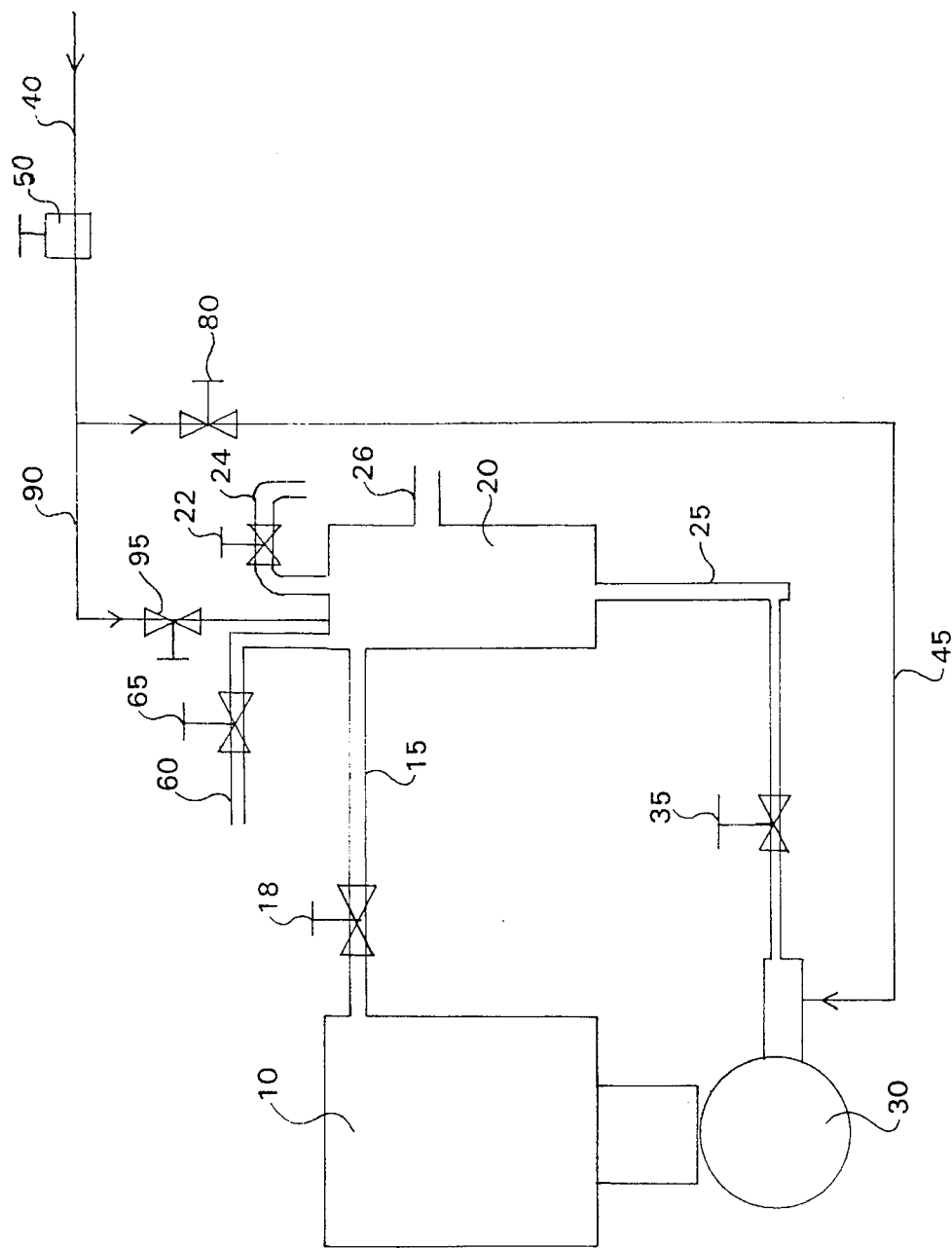
FIG. 1 diagrams a conventional package dye apparatus modified to perform the process of this invention.

The processes of this invention preferably include pretreating the fibers, which may be in the form of raw stock, yarn, fabric or manufactured fabric products such as garments, with a mordant solution, although pretreatment with a mordant (premordanting) is not required. It will be understood by those skilled in the art that premordanting is not presently used for indigo dyeing. In the most preferred processes of this invention, particularly where indigo is used with other dyes, a natural nonpolluting mordant solution may be utilized, such as the aqueous suspension of alum and soda ash disclosed in my copending application for United States Patent, Ser. No. 08/059,544, filed May 10, 1993, now U.S. Pat. No. 5,403,362, U.S. Ser. No. 08/414,341 filed Mar. 31, 1995, and application Ser. No. 08/476,507 filed concurrently herewith, the disclosures of which are incorporated herein by reference.

One useful mordant solution comprises an aqueous suspension of alum (potassium aluminum sulfate $KAl(SO_4)_2.12H_2O$) and soda ash ($Na_2CO_3$). As described more fully in my above-referenced United States patent and patent applications, the natural mordant solution is preferably prepared by adding alum to an aqueous solution of soda ash in water, which is then agitated and heated to a temperature of about 150° F. This forms an aqueous colloidal suspension of aluminum hydroxide. The pretreatment of the fibers with this nonpolluting aqueous mordant solution results in improved dyed fibers, particularly with natural indigo dye, as described herein. The fibers need not be dried after the premordanting process.

The processes of this invention for dyeing fibers with indigo may be conducted in most commercial dye machines, including rotary garment dyeing machines, piece dyeing machines of the beck and jet type, package dyeing machines, and range dyeing machines, modified to provide a substantially enclosed compartment, means for introducing a non-oxidizing gas into the compartment, and means for introducing leuco indigo dye liquor into the compartment. The term "fibers" as used herein, includes fibers as comprised in garments and other manufactured items made of fabric such as sheets and towels, bolts and rolls of fabric, yarns and raw stock, wood and other items comprising fibers.

Means for introducing a non-oxidizing gas into the compartment include valves and gas lines as known to the art, and as more particularly described hereinafter. The gas may be conducted into the compartment via a line or tube comprising holes for even distribution of the gas; may be bubbled through the liquid in the compartment, or may be piped directly into the gaseous atmosphere of the compartment. The non-oxidizing gas may be any gas or mixture of gases not containing oxygen or other oxidizing agents; preferably the gas is nitrogen or helium, and most preferably nitrogen.

Means for introducing leuco indigo dye liquor into the enclosed compartment may comprise a separate holding tank and lines preferably equipped with a valve or valves to control flow of the dye liquor. A conventional floating cover may be used on the holding tank or the tank may be enclosed to prevent oxidation of the reduced indigo. The separate holding tank may be a special enclosed container connected to the compartment by conduits, may be a covered bucket or pail from which the leuco indigo may be injected into the compartment, or may be an existing compartment of the dyeing apparatus, such as the expansion tank of a package dye machine.

The reduced indigo dye liquor is prepared by filling the holding tank with water, then stripping the water in the holding tank of oxygen by adding a known reducing agent such as sodium hydrosulfite at appropriate pH (adjusted preferably with sodium hydroxide) to the water, and then adding indigotin or indigo blue concentrate subsurface. This leuco indigo dye liquor is preferably kept in the holding tank until it is introduced into the enclosed compartment of the commercial dyeing apparatus (preferably below the surface of the liquid) from which oxidizing gases have been removed by introduction of the non-oxidizing gas. The amount of reduced indigo dye stock to be used is generally calculated based on the weight of the fibers being dyed and the desired intensity of shade, as is known to the art.

After the leuco (reduced) indigo dye liquor has been introduced into the enclosed compartment of the dyeing apparatus, the fibers are allowed to remain, preferably with agitation, in the leuco indigo dye liquor, until they are saturated with the leuco indigo. The leuco indigo, being soluble in water, penetrates and is absorbed into the fibers.

After allowing a sufficient time for the fibers to take up the leuco indigo, as is known to the art, the fibers are contacted with an oxidizing agent to oxidize the leuco indigo to its blue, insoluble oxidized form. Preferably the oxidation step is accomplished by flooding the fibers with water containing oxygen, preferably water at a temperature of less than 90° F. Other oxidizing agents as known to the art may be used, such as hydrogen peroxide, which may be beneficial when the water temperature is higher than 90 degrees F. Oxygen in the air may also be used. It is preferred that the oxidizing step be conducted slowly so as to avoid or minimize streaking. For example, in processes utilizing water oxidation, it is preferred that the non-oxidizing gas flow be stopped and the dye liquor present allowed to assume a blue color as a result of slow oxidation caused by leakage of the container before draining and refilling or adding the water used to oxidize the dye in an overflow rinse. Alternatively, hydrogen peroxide can be added to the water to initiate slow oxidation.

Following oxidation, the fibers may be removed from the dyeing apparatus and dried or subjected to further treatments as known to the art. Alternatively, they may be redyed with indigo to achieve a more intense shade, or dyed with other dyes to produce a full palette of colors.

The indigo dye processes of this invention are used to dye fibers or fabric in commercial dye machines adapted for the purpose as described herein.

In a preferred process of this invention, a conventional garment dye machine, which resembles a front-loading washing machine, is filled with fibers in the form of fabric or garments. The enclosed compartment of the commercial machine is substantially airtight for purposes of this invention. The compartment is filled with water to the usual level and the fibers are "wetted out" by exposure to a wetting agent known to the art such as Ecowet™ of Southeast Chemical Corp. Typically, a 20:1 weight ratio of water to fibers is used for medium to heavy weight woven materials, while a lesser ratio, e.g., 10:1 to 15:1 is used for lighter or knit materials. After agitating for a sufficient amount of time to accomplish the wetting out, preferably about five minutes, the water in the compartment may be drained, or the dye liquor may be added directly to the water and fibers in the compartment without draining.

An improvement in the process of this invention over that described in applicant's issued U.S. Pat. No. 5,378,246 is the elimination of the step of draining the compartment prior to adding the dye liquor. This was not previously believed feasible due to the presence of oxygen in the water in the compartment. However, applicant has now discovered that sufficient reducing agents can be added to the water in the compartment to substantially take up the oxygen present. This improvement allows the size of the separate holding tank used for the dye liquor to be reduced.

The temperature of the water in the compartment during the dyeing process is preferably between about 100° F. and about 110° F., and more preferably between about 90° F. and about 120° F. At temperatures less than 90° F., uptake of the dye will be reduced and lighter shades will result. At 140° F., leuco indigo is destroyed. The water may be added to the compartment at the desired temperature, or the compartment may be equipped with heating means to heat the water to the desired temperature.

Meanwhile, a separate holding tank is filled with water. Reducing agent is added as known to the art, such as hydrosulfite at about 0.5 grams per gallon of water (in the compartment and the holding tank). A greater concentration of hydrosulfite can be used but, as is known to the art, excess reducing agent tends to lighten the dye. A wetting agent such as Ecowet™ may optionally be used at this point as a leveling agent to prevent uneven dyeing, preferably in an amount of about 2 ml per total gallons of water. The mixture in the holding tank should be stirred thoroughly and allowed to set for a short period to rid the tank of oxygen.

A non-oxidizing gas, preferably nitrogen, is then introduced into the enclosed compartment to replace the atmosphere inside. When the oxygen is substantially cleared from the atmosphere inside the compartment, e.g. after about five minutes for sample machines and about ten minutes or more for larger production machines, water from the holding tank containing reducing agent is introduced into the compartment and allowed to mix with the water and fibers in the compartment. Sufficient reducing agent in solution is introduced into the compartment during this step, and mixing is performed for a sufficient time, e.g. about four minutes, to substantially clear the water and fibers of oxygen. In a preferred embodiment, about half the water in the holding tank is introduced into the compartment at this point. Preferably, non-oxidizing gas flow is maintained into the compartment during this period.

The required amount of leuco indigo dye stock for the fibers is then mixed into the holding tank subsurface. The amount of dye required depends on the desired shade. In prior art processes for dyeing with indigo, it has been conventional to dye to a darker shade than desired for the final product, repeatedly exposing the fibers to the dye to achieve this darker shade, then washing the fibers until the color fades to the intensity desired. With the present process, however, particularly when premordanting is done, it is possible to achieve the desired shade without the necessity for washing to fade the color. The amount of dye required depends on the type of fiber, the type of fabric (e.g. woven or knit), and the color intensity desired, and as is usual in the art, is determined by pretesting the materials to be dyed.

Once the oxygen has been substantially exhausted from the enclosed compartment of the garment dyeing apparatus, the leuco indigo solution from the holding tank is introduced into the compartment preferably below the surface of the water in the compartment.

The fibers are then agitated in the machine for a time sufficient to provide the desired uptake of dye into the fibers, typically for about seven minutes. It is preferred that the non-oxidizing gas flow into the compartment be continued during this period.

After dye uptake is complete, the leuco indigo in the fibers is oxidized to the blue indigotin form. It is preferred that the oxidation be started slowly to avoid streaking. In a preferred embodiment, the flow of non-oxidizing gas is stopped, and the liquid in the compartment allowed to turn blue, preferably with agitation of the machine. The blue color is produced by oxidation by oxygen leaking into the system because the compartment is not completely air-tight. The machine may be drained at this point, followed by the addition of water containing oxygen to complete the oxidation process. Preferably, however, an overflow rinse with water containing oxygen is used to avoid having the fibers partly in and partly out of the dye liquor for the draining period, as such is likely to cause uneven dyeing.

The oxidation step may also be performed by other oxidizing agents known to the art such as water containing hydrogen peroxide and/or air; however for garment dyeing, water at a temperature below about 90° F., which naturally contains dissolved oxygen, is preferred.

The process of this invention may also be performed in a commercial piece dyeing machine. Commercial piece dye machines are enclosed, but not all are airtight. The process is suitable for use in the beck or jet-type piece dyeing machines. The fabric, which is generally in the form of a continuous loop as described above, is placed in the machine and water is added to the enclosed compartment (dye tank). A lubricant may be added at this point as is known to the art to prevent the fabric from showing roll marks. Wetting agents tend to foam and are preferably not used at this point in the process. Generally, tap water is used to fill the compartment, and thereafter the water is preferably heated by heating means in the machine to the appropriate temperature as described above in connection with garment dyeing, preferably about 100° to 110° F.

A holding tank, which may be a pump cart connected to the enclosed compartment by lines or hoses, having a capacity of at least about 20 gallons, is filled with water. Sodium hydrosulfite as described above is added to the water in the holding tank with thorough mixing to strip oxygen from the water. This reduced water is then circulated through the lines to clear and flush the lines. A conventional wetting agent may be added to this water. Lubricant added at this point tends to cause streaking and is preferably not used.

Meanwhile nitrogen or other non-oxidizing gas is introduced into the enclosed compartment of the piece dyeing machine and allowed to run long enough to displace oxygen from the atmosphere, as well as from the exposed portion of the fabric loop. Generally, running the gas for about 14 or 15 minutes is sufficient. The fabric is preferably circulated in the machine while the gas is running.

A portion of the reduced water in the holding tank, preferably about half, is then introduced into the compartment of the piece dyeing machine and the fabric is circulated for a further period of time, e.g. about ten minutes, to remove oxygen from the system.

The reduced indigo dye liquor in the leuco state is then introduced into the holding tank as described above. The dye liquor is pumped from the holding tank to the dye tank of the machine, preferably below the water level of the compartment, while maintaining the nonoxidizing atmosphere. The machine then continues to agitate and lift the fabric for about ten to fifteen minutes.

As described, it is desirable to control the rate of oxidation of the indigo dye. This is preferably accomplished by first turning off the non-oxidizing gas supply to the piece dyeing machine for a few minutes, which allows the oxidation process to begin as a result of atmospheric oxygen leaking into the machine. An overflow rinse is then preferably begun and allowed to run for about four to five minutes. On jet-type machines, the overflow rinse is not necessary. The machine is then drained as quickly as possible and the fabric is flooded with water which contains oxygen, hydrogen peroxide or other oxidizing agent, completing the oxidation process. The fabric is preferably agitated in the machine during oxidation. Finally, the dyed fabric is removed from the machine by conventional means.

Commercial package dye machines are used to dye yarn and include one or more, generally a plurality, of perforated stainless steel tubes which are received on mandrels enclosed in the package kier. The yarn to be dyed is spirally wound on the tubes and the dye liquor is repeatedly pumped through the yarn, into and out of the tubes, which are submerged in the dye liquor. At present, yarn is not dyed with indigo in package dye machines because the indigo dye uptake on the yarn is not sufficient or consistent.

FIG. 1 shows a typical package dyeing machine modified for conducting an indigo dye process of this invention. The machine comprises a package kier 10 and a holding tank 20 (also referred to as an expansion tank) which typically has a capacity about half that of package kier 10. Package kier 10 and holding tank 20 are connected by an upper conduit 15 equipped with an upper valve 18. The holding tank 20 is also equipped with a drain conduit 24 having a drain conduit valve 22, as well as bleeder conduit 60 equipped with bleeder valve 65, and fill water conduit 26 for adding water such as tap water to the machine. The package kier 10 and holding tank 20 are also connected by a lower conduit 25 equipped with a lower valve 35. A reversing pump 30 powers the flow of liquid between package kier 10 and holding tank 20. The machine is equipped with a nitrogen line 40 which splits into package kier nitrogen line 45 and holding tank nitrogen line 90. Each nitrogen line is equipped with a valve, i.e., package kier nitrogen valve 80 and holding tank nitrogen valve 95.

In the process of this invention, holding tank 20 is filled with water, preferably including a wetting agent such as Ecowet™ in an amount of about 0.3 g per gallon, and sodium hydrosulfite, as described above. When holding tank 20 has a capacity less than that of package kier 10, a separate container (not shown) is filled with water containing a reducing agent, sufficient, when added to the water in holding tank 20, to fill package kier 10.

Package kier 10 contains the yarn to be dyed, and may be full of water, preferably containing a wetting agent, or may be empty of water. To purge package kier 10 of oxygen, after closing the lids on holding tank 20 and package kier 10, upper valve 18 and bleeder valve 65 are opened. At this point holding tank nitrogen line 90 is closed by means of holding tank nitrogen valve 95. Nitrogen or other non-oxidizing gas is then introduced into package kier 10. The gas is run for a sufficient period of time to substantially replace the oxygen in package kier 10.

The liquid in the system is then purged of oxygen. Upper valve 18 and bleeder valve 65 are closed. Lower valve 35 remains closed. Bleeder valve 65 is opened to allow gas to escape as holding tank 20 fills with liquid, and is closed when holding tank 20 is full. Package kier nitrogen valve 80 is closed, lower valve 35 is opened, and pump 30 is turned on so that water from holding tank 20 fills into package kier 10. If holding tank 20 has a lesser capacity than package kier 10, when holding tank 20 is empty, additional reduced water from the separate container is added to holding tank 20 and allowed to fill into package kier 10 until both package kier 10 and holding tank 20 are full except for the amount necessary to add the leuco indigo dye stock.

The leuco indigo dye stock is prepared and added to holding tank 20, preferably subsurface as described above. The lid of holding tank 20 is closed, and holding tank nitrogen valve 95 and bleeder valve 65 are opened and the non-oxidizing gas is allowed to flow to purge oxygen from the system, generally about three minutes. Bleeder valve 65 is then closed, and the gas flow is reduced. Upper valve 18 and lower valve 35 are then opened and the machine is turned on to allow pressurized leuco indigo dye liquor to flow in and out of the tube on which the yarn is wound inside package kier 10. Operation of the machine is continued for long enough to allow uptake of the dye by the yarn, e.g. about eight minutes. Gas flow is then turned off, and the machine is drained or an overflow rinse is begun, allowing water to fill into holding tank 20 through fill water conduit 26 and circulate into package kier 10 and out through drain conduit 24 with drain conduit valve 22 in the open position. In package dyeing with indigo, it is preferred that the dye liquor be drained before oxidation is begun to avoid deposit of particles of oxidized indigo on the fibers.

The package dye process described above may also be used for dyeing raw stock such as wool and cotton fibers by filling package kier 10 with raw stock to be dyed.

Figure 2A:
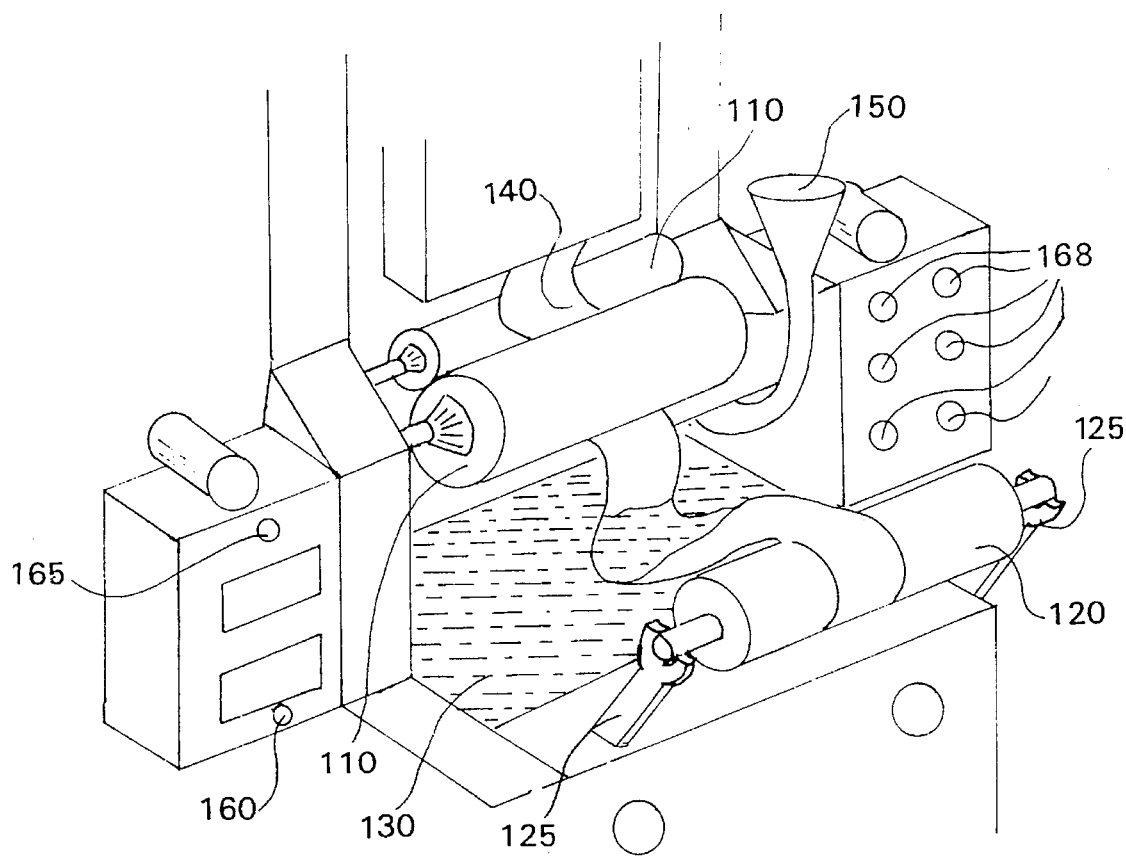
FIG. 2a depicts a conventional range dye apparatus.
Figure 2B:
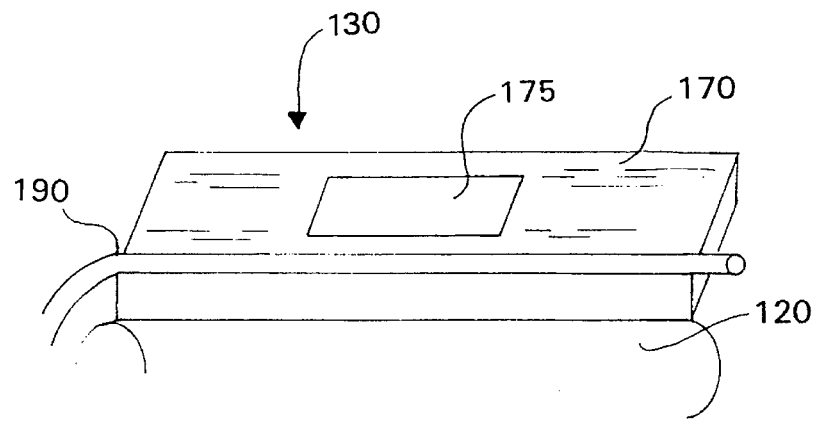
FIG. 2b shows modifications for performing the process of this invention.

FIG. 2a shows a conventional range dyeing machine (not to scale). The machine comprises a fabric roller 120 held on fabric roller brackets 125 which allows fabric 140 to unroll and feed through dye trough 130, and then through squeeze pad rollers 110. Dye liquor is fed to dye trough 130 through dye feed means 150. Speed and dwell controls 160 and temperature control 165 control the speed, dwell time of the fabric in the dye liquor, and the temperature of the dye liquor. Rinse, pad roller and motor controls 168 control other operations of the machine. In the improved range dyeing machine of this invention shown in FIG. 2b, dye trough 130 is fitted with a removable cover 170. Fabric 140 feeds from fabric roller 120 into the enclosed compartment formed by lower dye trough 130 and removable cover 170, exiting through fabric feed hole 175 from whence it runs through squeeze pad rollers 110. The said enclosed compartment is equipped with nitrogen tube 190 pierced with spaced holes, e.g about every one-half inch, through which nitrogen is flowed into the compartment during dyeing. The machine is also equipped with a leuco indigo dye liquor conduit (not shown) for delivering reduce indigo dye liquor into lower dye trough 130 subsurface.

In the process of this invention, the trough is filled with a reduced leuco indigo dye liquor as described above, preferably by filling the trough with reduced water and adding leuco indigo dye stock subsurface. The dye liquor is replenished as needed through enclosed conduits providing reduced dye liquor under the surface of the liquid in lower dye trough 130. Flow of nitrogen (or other non-oxidizing gas) through nitrogen tube 190 is begun to exhaust oxygen. Fabric is fed from fabric roller 120 into the enclosed compartment formed by lower dye trough 130 and removable cover 170 while gas flow is maintained. Fabric exits the compartment through fabric feed hole 175 where it contacts the air and is oxidized to a blue color as it feeds through squeeze pad rollers 110. Conventional skying or steam treatment is not required. Squeeze roller pads 110 squeeze liquid containing oxidized indigo out of the fabric into upper dye trough 115, from whence it may be recovered or disposed. Multiple troughs and pads may be utilized to achieve darker shades of indigo as desired.

The processes of this invention may also be utilized to dye over other colors, or to pre-dye fibers which will then be dyed with other colors, producing a full palette of consistently reproducible natural colors which are washfast and lightfast.

EXAMPLE

Having described the indigo dye processes of this invention, the following is an example of an application of this process used in dyeing garments, namely men's and women's shirts and women's dresses made of cotton fiber. First, a premordant was made for pretreating the fibers. A quantity of premordant was prepared for treating 22.7 kg of cotton textile fiber (about 50 pounds). First, a solution of soda ash in water was prepared which contained 2% of the weight of the fibers to be treated of soda ash (454 g). The soda ash was added to 5 gallons of warm water and the water was stirred to dissolve all the soda ash. The warm water had a temperature of about 80° to 120° F. Fifteen percent of the weight of the fibers of powdered alum or 3.4 kg was then added slowly to the aqueous solution of soda ash. The alum must be added slowly to avoid flashing, although the solution will foam as the alum is added. The solution was then heated to a temperature of about 150° with stirring. A colloidal suspension of aluminum hydroxide began to form at a temperature of about 140° F. The mordant solution was then ready for use in pretreating the fibers.

Fifty pounds of cotton garments to be dyed were then placed in an industrial "Unimac Washer Extractor" and the fibers were thoroughly wetted out with warm water containing 40 ml "Ecowet" commercial wetting agent. One-half of the premordant solution was then added and the solution was heated to 120° F. and agitated for about 10 minutes. The remainder of the mordant solution was then added and the temperature was raised to 140° F. and agitation continued for 10 minutes. The temperature was then raised to 165° F. and agitation continued for 45 minutes. The temperature was then reduced to 120° F., the mordant solution was dained, and the garments were thoroughly rinsed with warm water and drained.

The pretreated or premordanted cotton fabric was then ready for dyeing with indigo dye. The indigo dye holding tank was prepared by adding 25 gallons of warm water to the tank. 64.5 g reducing agent comprising sodium hydrosulfite was then added to the water to strip oxygen from the water.

The 50 pounds of pretreated cotton garments were then wetted out with warm water containing about 200 ml of "Ecowet" commercial wetting solution. Without draining the wetting solution, the fibers were agitated and the chamber was flooded with nitrogen for a few minutes to remove oxygen from the chamber. As described, the process of this example was conducted in a Unimac Washer Extractor having a drum rotatable on a horizontal axis to agitate the fibers or garments.

One-half the contents of the holding tank comprising reducing agent in solution was then added to the chamber of the washer with the fibers to clear oxygen from the water and fibers.

Seventeen liters or 4.5 gallons of indigo dye stock in the reduced leuco state was then added to the holding tank below the surface of the liquid in the tank. As described above, the reduced indigo dye stock may be produced by conventional methods, wherein commercially available liquid indigotin is added to a weak aqueous solution of sodium hydroxide and a reducing agent.

The remaining contents of the indigo holding tank containing leuco indigo were then emptied into the chamber and the garments were agitated for about six minutes with gas, about four minutes without gas in the aqueous solution of reduced indigo dye in the contained inert atmosphere. The aqueous indigo dye solution was then drained and the chamber was immediately filled with cold water and agitated for about 10 minutes to oxidize the indigo, as described above. The indigo dye process was then repeated to produce a natural indigo blue of the desired shade.

As will be understood by those skilled in the art, various modifications may be made to the indigo dye process of this invention within the purview of the appended claims.

I claim:

1. A process for dyeing fibers with indigo comprising:
   a. placing said fibers in a substantially enclosed compartment of a commercial dye apparatus, wherein said apparatus comprises means for introducing a non-oxidizing gas into said compartment;
   b. Prior to or following step a. introducing a non-oxidizing gas into said compartment to produce a substantially non-oxidizing atmosphere therein;
   c. after steps a. and b. contacting said fibers with a dye liquor comprising leuco indigo in said compartment containing said substantially non-oxidizing atmosphere whereby said leuco indigo is taken up by said fibers;
   d. oxidizing said leuco indigo taken up by said fibers to produce a blue color in said fibers.

2. The process of claim 1 performed in a rotary commercial garment dyeing apparatus comprising a substantially airtight compartment and means for introducing a non-oxidizing gas into said compartment.

3. The process of claim 1 performed in a commercial piece dyeing apparatus comprising a substantially airtight compartment and means for introducing a non-oxidizing gas into said compartment.

4. The process of claim 1 performed in a commercial package dyeing apparatus comprising a substantially airtight compartment and means for introducing a non-oxidizing gas into said compartment.

5. The process of claim 1 performed in a commercial range dyeing apparatus comprising a substantially airtight compartment and means for introducing a non-oxidizing gas into said compartment.

6. The process of claim 1 in which said non-oxidizing gas is nitrogen.

7. The process of claim 1 in which said oxidizing step comprises contacting said fibers with water containing dissolved oxygen.

8. The process of claim 1 in which said oxidizing step comprises contacting said fibers with hydrogen peroxide.

9. The process of claim 1 in which said oxidizing step comprises contacting said fibers with air.

10. The process of claim 1 wherein said indigo is natural indigo.

11. The process of claim 1 wherein said indigo is synthetic indigo.

12. The process of claim 1 wherein said fibers comprise cellulose fibers.

13. The process of claim 1 wherein said fibers comprise synthetic fibers.

14. The process of claim 1 wherein said leuco indigo dye liquor is conducted from a separate holding tank into said compartment.

15. The process of claim 14 wherein said fibers are immersed in liquid in said compartment at the time said leuco indigo dye liquor is introduced into said compartment.

16. The process of claim 1 wherein said compartment is drained of liquid prior to oxidizing said leuco indigo.

17. The process of claim 1 wherein said oxidizing step is initiated prior to draining said liquid.

18. The process of claim 1 also comprising premordanting said fibers.

19. The process of claim 1 comprising pretreating said fibers with a mordant comprising an aqueous colloidal suspension of aluminum hydroxide prior to contacting said fibers with said dye liquor comprising leuco indigo.

20. The process of claim 1 wherein said fibers comprise raw stock.

21. The process of claim 1 wherein said fibers comprise natural fibers comprising silk and wool fibers.

22. A process for dyeing fibers selected from the group consisting of natural fibers and synthetic fibers, in a form selected from the group consisting off woven or knit textiles or garments, yarn and raw stock, comprising:
   a. placing the fibers in a substantially enclosed compartment of a commercial dye apparatus selected from the group consisting of commercial apparatuses for garment dyeing, package dyeing, range dyeing, and piece dyeing, wherein said apparatus comprises means for introducing a non-oxidizing gas into said compartment;
   b. prior to or following step a. introducing a non-oxidizing gas comprising nitrogen into said compartment to produce a substantially non-oxidizing atmosphere therein;
   c. following steps a. and b. contacting said fibers in said compartment containing said substantially non-oxidizing atmosphere with a dye liquor comprising natural leuco indigo or synthetic leuco indigo whereby said leuco indigo is taken up by said fibers at a temperature between about 90 degrees F. and about 120 degrees F.;
   d. oxidizing said leuco indigo taken up by said fibers with an oxidizing agent selected from the group consisting of water containing dissolved oxygen at a temperature below about 90 degrees F., hydrogen peroxide, and air, to produce a blue color in said fibers.

* * * * *